March 3, 1959    A. D. SYLVESTER ET AL    2,875,543
SURFACE ORNAMENTATION OF FLEXIBLE SHEET MATERIALS
AND METHOD OF MAKING TOOLS FOR
PRODUCING SUCH ORNAMENTATION
Filed Sept. 4, 1957    2 Sheets-Sheet 1

INVENTORS
ARTHUR D. SYLVESTER
ARNO SCHEIDING
BY
Robert P. Dunham
ATTORNEY

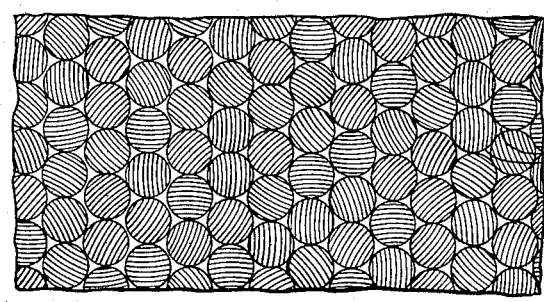
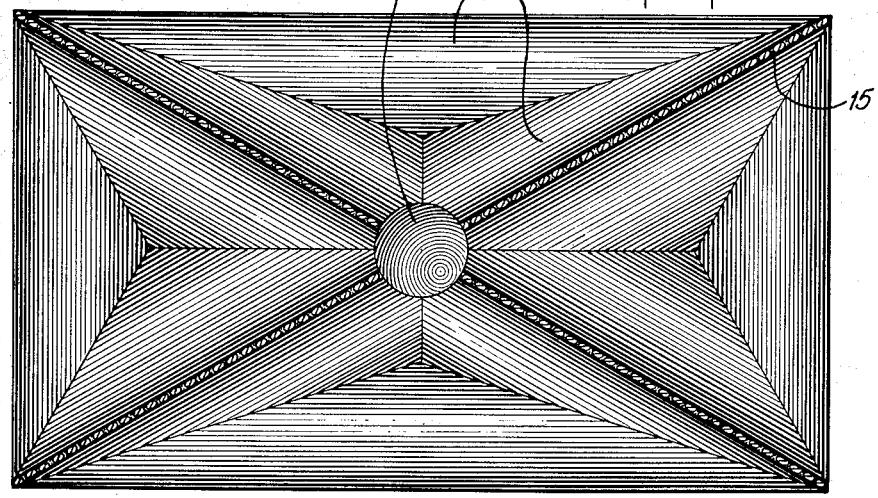
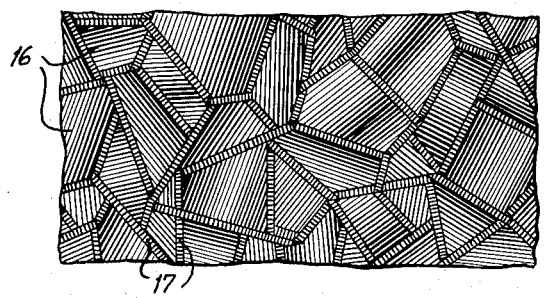
INVENTORS
ARTHUR D. SYLVESTER
ARNO SCHEIDING

2,875,543

SURFACE ORNAMENTATION OF FLEXIBLE SHEET MATERIALS AND METHOD OF MAKING TOOLS FOR PRODUCING SUCH ORNAMENTATION

Arthur D. Sylvester and Arno H. Scheiding, Rowayton, Conn., assignors to L. E. Carpenter & Company, Inc., Wharton, N. J., a corporation of New Jersey Application September 4, 1957, Serial No. 682,566

7 Claims. (Cl. 41—19)

This application is a continuation-in-part of our copending application, Serial No. 578,762 filed April 17, 1956, entitled, "Surface Ornamentation," now abandoned.

The present invention relates to surface ornamentation of limply flexible sheet materials, and to a method of creating composite patterns of such ornamentation, so that such patterns can be reproduced in large quantities.

By limply flexible sheet materials are meant those which are non-resilient and which thereby tend to take up the contour of an underlying support rather than to assume an inherent contour of their own. Decorative sheet materials constructed in accordance with the present invention may be used as covering materials for a wide variety of articles, such as interior walls, floors, furniture, ladies' handbags, and shoes. Such materials, may also be used by themselves, either as drapery materials, e. g., curtains, to manufacture various other articles, including lamp shades, some articles of clothing, e. g., raincoats, and inflatable articles, e. g., beach balls.

The invention is described herein as applied to limply flexible sheet materails having at least a surface layer formed of a dispersion coating of vinyl resin plastic. Many other resinous plastic materials are also suitable. This surface layer may be supported on a backing sheet of suitable material such as a woven fabric, e. g., cotton drill. Alternatively, the layer of plastic may be unsupported, i. e., it may constitute the whole of the sheet material. Typically, the ornamentation according to the present invention is applied to the resinous plastic surface by conventional embossing procedures.

This invention is characterized by arrays of ridges and grooves in the surface of a sheet material of the type described, and constructed so as to produce optical illusions as to the surface contour.

The particular illusions with which the present invention is concerned relate to the depth of the ornamental design produced on the surface of the sheet material, and to the thickness of that material. The illusions convey an impression that parts of the design are raised and others depressed, and may also convey an impression that the material is thicker than it actually is.

By virtue of the illusion effects which may be produced, the present invention opens up a whole new field of possibilities in the design of decorative sheet materials of the type described.

The arrays of ridges and grooves in accordance with the invention are capable of mass reproduction by conventional processes, e. g., embossing.

The present invention therefore makes available for distribution to the public a wide range of novel and artistic designs in such materials, and the possibilites for the creation of additional new designs according to the invention are almost limitless.

It has been noted that a general condition required for visual recognition of a surface by an observer is a gradient, along a direction transverse to the line of vision, in some quality of the light reaching the observer's eye from that surface.

It has further been noted that a general condition required for visual recognition by an observer of an edge of a surface, is an abrupt transition, or discontinuity, in some quality of the light reaching the observer's eye, said discontinuity appearing to the observer between regions adjaecnt one another along a line transverse to the edge, and located on opposite sides of the edge.

Such gradients and discontinuities are correlates of the surfaces and edges, and the appearance of such gradients and discontinuities suggests to an observer that the correlative surfaces and edges exist, even though the gradients and discontinuities are produced by means other than the actual surfaces and edges. The observer may then be said to expereince an optical illusion.

An object of the present invention is to provide limply flexible sheet materials of the type described, in surfaces of which there are formed a multiplicity of generally parallel ridges and grooves contoured to produce gradients and/or discontinuities in the light reflected therefrom to an observer.

Another object is to provide a method of producing patterns of such ridges and grooves which are capable of mass reproduction in limply flexible sheet materials by conventional processes.

A further object is to provide a method of producing patterns of the type described which are suitable for reproduction by embossing.

Another object is to provide materials of the type described, embossed with patterns of ridges and grooves which produce an illusion of thickness, whereby a thin sheet material embodying the invention has an appearance of thickness several times its actual thickness.

Another object of the invention is to provide transparent, or translucent, limply flexible sheet material having a surface thereof embossed with a pattern of ridges and grooves which produces an optical illusion as to the thickness of the material.

Another object is to provide opaque, limply flexible sheet material having a pattern of ridges and grooves of the type described.

Another object is to provide sheet material of the type described, having a surface embossed with a composite pattern comprising a plurality of design areas, each having its own pattern of ridges and grooves providing a particular gradient of light quality, the several areas benig separated from one another by discontinuities in the ridges and grooves which provide sharp distinctions between the apparent contours of adjacent design areas.

Another object of the invention, is to provide a method of producing a master surface embodying a composite pattern of the type described.

The foregoing and other objects of the invention are attained by forming in the surface of a limply flexible, resinous plastic sheet material an embossed pattern of alternating sharply peaked ridges and V-shaped grooves, whose profiles, taken along a section at right angles to the ridges and grooves, are formed of substantially straight lines, with the sides of the ridges steeper on one side than on the other, with the grooves varying progressively in depth along said section, with the ridges varying progressively along said section with respect to the angles at the peaks of the successive ridges, and hence with respect to the slopes of the sides of the ridges, and with the largest peak angles located at the ridges adjoining the shallowest grooves. It has been found that if such a pattern is formed in a sheet material, there is produced a gradient in the light reflected from the material toward an observer's eye, which gradient is a correlate of a surface sloped differently from the general contour of the material. For example, if the material is supported so that the peaks of all the ridges lie in the same plane, this gradient conveys an optical illusion that the material is sloped with respect to that plane, and that the slope decreases in the direction in which the peak angles increase in magnitude and the grooves decrease in depth. If the steeper side of each ridge is on the side toward the shallower of the two grooves which define the ridge, then the material appears convex in contour. If the steeper side of each ridge is on the side towards the deeper of the two grooves which define the ridge, then the material appears concave in contour. By reversing the trend of the progressive variations in groove depth and peak angle at an intermediate locality of a design area, the material may be made to appear convex on one side of the locality and concave on the other.

The limply flexible sheet material may be used as a covering for various articles, in which case the sheet material assumes the contour of the underlying article. The combined effects of the actual assumed contour and of the apparent illusory contour then produce a novel and distinctive ornamental effect.

Alternatively, the limply flexible sheet material may be used to form various articles, e. g., curtains, raincoats. In that event, the combination of the effect of the folds and/or curves of the material and the effect of the apparent illusory contour then produce a distinctive ornamental effect.

In the latter case, the ornamental effect produced is heightened if the material is translucent or transparent. Such materials have an additional illusion of thickness which emphasizes and modifies the ornamental effect.

It is preferred to divide the surface of the sheet material into a composite pattern comprising a multiplicity of design areas, each having a distinct and particular arrangement of the ridges and grooves and producing a particular gradient in the quality of light reaching an observer and thereby providing a particular contour illusion. By arranging the design areas so that the ridges and grooves are discontinuous at the common boundary of adjacent design areas, the different illusions in the adjacent areas cooperate to form a further illusion of an edge, or a sharp change in contour between the two design areas.

A master surface embodying a composite pattern such as that described above may be formed, according to another feature of the invention, by forming in one surface of a flexible plastic sheet material a plurality of design regions, each having a pattern consisting of a multiplicity of alternate ridges and grooves varying progressively as to the slopes of the ridge sides, and with the ridges and grooves extending continuously throughout each region. A plurality of individual design pieces are then cut from the several regions by means of cuts extending, at least in part, transversely to the ridges and grooves. The selection and cutting of these pieces must be done with extreme care and with a view to the final design which is to be produced. The final design depends upon proper selection of these pieces and their correct assembly. These design pieces are then assembled and bonded together at their edges, with the ridged surface outward and with the transverse cuts of adjacent areas in abutting relation. The ridged surface of the assembly of design pieces then presents the master surface to be duplicated. One suitable method of duplicating the master surface is to silver it and then to electroplate the silvered surface to build up the metal to a desired thickness. The assembly of design pieces is then stripped off the metal, leaving a sheet of metal formed in the desired design and usable, after mounting on suitable backing structure, as an embossing tool.

Other objects and advantages of the invention will become apparent from a consideration of the following description and claims, taken together with the accompanying drawings, in which:

Fig. 5 is a sectional view, taken on the line V—V of Fig. 4 on an enlarged scale;

Fig. 6 is an end elevation of two-ply sheet material embodying a modified form of the invention;

Figs. 7, 8 and 9 are plan views of other sheet materials illustrating other patterns embodying the invention.

Figure 1:
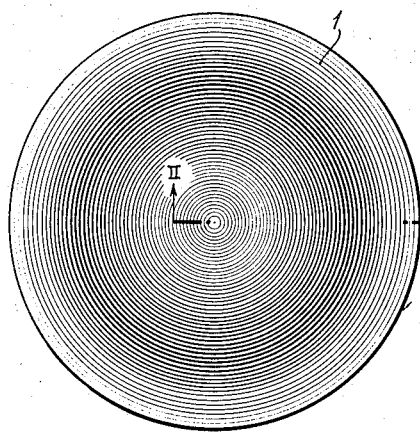
Fig. 1 is a plan view of a piece of sheet material provided with a circular pattern embodying certain features of the invention.
Figure 2:
Fig. 2 is a cross-sectional view, on an enlarged scale, taken on the line II—II of Fig. 1.

*Figs. 1 and 2*

These figures illustrate a piece of sheet material, generally indicated by the reference numeral 1 and having formed in its upper surface, as viewed in Fig. 2, a series of concentric ridges 2 separated by grooves 3. As best seen in Fig. 2, the central portion 4 of the upper surface of the sheet 1 is flat. The grooves 3 are defined by conical surfaces 3a on the side of each groove nearest the central portion 4, and by cylindrical surfaces 3b, substantially perpendicular to the general plane of the material, on the sides of the grooves farthest from the central portion 4. The surface 3a of the groove nearest the central portion 4 makes a very shallow angle with the general plane of the material which is illustrated in Fig. 2 as being horizontal. Beginning at the central portion 4 and proceeding toward the periphery of the piece 1, each successive surface 3a is a cone making a slightly greater angle with the horizontal than the preceding surface 3a. In other words, the angles at the peaks of the ridges progressively decrease. After the median radius is passed, the angles between the successive surfaces 3a and the general plane of the material decrease again. In other words, at the median radius the trend reverses, and the angles at the peaks of the ridges progressively increase. Since the spacing between the peaks of the ridges 2 is substantially equal, these changes in the angles of the conical surfaces are accompanied by a gradual increase in the depths of the grooves as the distance from the central section 4 increases, followed by a gradual decrease, after the median radius is passed.

The plane surfaces 3b on the sides of the grooves 3 farthest from the central section 4 need not necessarily be perpendicular to the general plane of the material, as shown, but should be steeply sloped (preferably making an angle of more than 60° with that general plane) and for best results should not vary substantially from one to another as to their angle of slope. Their slope should always be steeper than the greatest slope on the surfaces 3a.

When the structure illustrated in Figs. 1 and 2 is illuminated by a source of light, it provides a gradient in the light from that source which is reflected toward an observer. As the focus of the observer's eye moves from the center of the ridges and grooves toward the edge, the gradient changes in one sense, reverses at about the median radius, and thereafter changes in the opposite sense. These different gradients may be interpreted differently by different observers, or by the same observer under different conditions of illumination. The gradients always produce, however, an illusion that the surface slopes toward or away from the observer's eye. Typically, the optical illusion makes the surface appear to be convex at the center. The peripheral portion of the piece 1, on the other hand, appears concave, so that the central portion seems to have a thickness several times as great as the peripheral portion. Fig. 1 is shaded to illustrate this illusion. This typical illusion may be defined as one which appears as a slope of the material decreasing in the direction in which the peak angles increase in magnitude and the grooves decrease in depth.

The reversal of the trend as to the progressive variation in the ridge peak angles and the groove depths, at an intermediate locality in the design pattern, as described above, enhances greatly the optical illusion as to the contour of the material, particularly by producing a contrast between the central portion of the design area and the peripheral portions. This technique may be used to produce similar contrasts between different portions of other designs, and is in no way limited to this particular desgin. The contrast is not sharply defined, but may nevertheless be readily observed, and is remarkable for the fact that the observer cannot readily tell by what mechanism it is produced.

An alternative embodiment of the invention may be constructed using a circular pattern similar to that illustrated in Fig. 1, but with the ridge structure reversed from the contours shown in Fig. 2 so that the steep sides of the ridges are the sides farthest from the center, while the sides of progressively changing slope are those nearest the center. Such a modification appears to be concave across the center changing to convex at the median radius where the trends of the changing groove depths and peak angles reverse, so that the peripheral portions appear convex.

Both the concave and convex illusions described above are readily observed when the plastic material in which the pattern appears is opaque.

The sheet material 1 may be made of a translucent or transparent substance, in which case the optical illusion of contour is accompanied by an illusion of thickness which differs considerably, depending upon the particular side of the material which is nearest the viewer. If the grooved side is nearest the viewer, the illusion of convexity (or concavity, as the case may be), as described above, is retained, and the material appears somewhat thicker than it actually is. If the smooth side is nearest the viewer, the illusion of convexity or concavity is less apparent, since it is overshadowed by a very striking illusion, which in the case of the concave material, may be described as that of looking into a transparent member having a flat outer surface and a depth considerably greater than the actual thickness of the material. The sensation is similar to that of looking through a flat surface on a glass brick. In the case of the convex material, the illusion creates the impression that a bubble-like surface is floating in the air above the actual plane of the material.

The illusion of thickness in translucent and transparent materials is at least in part created by multiple internal inflections of light passing through the material. Because of these internal reflections, the rays of light are diffused in passing through the material, resulting in an appearance of thickness substantially greater than the actual thickness.

The original patterns may be formed in suitable, initially smooth material by means of engraving tools of any suitable construction. The circular patterns may be either formed on a gang engraving machine with a multiplicity of engraving points, or they may be formed by a single engraving point moved through a succession of circles or through a spiral figure. Other well known engraving methods may be utilized to construct the original patterns. After the original pattern is made, a mold is made from it by any suitable conventional process. The mold so prepared may be utilized to reproduce the pattern by any conventional process. For example, an embossing roll may be prepared from the mold and used to reproduce the pattern in sheet material.

The sheet material may be embossed in any suitable manner, and may be made of any suitable substance. It is presently preferred to prepare this sheet material as an embossed vinyl dispersion, which may be a coating on a fabric backing, or may be an unsupported sheet. There are many well known methods and techniques for producing such vinyl dispersion sheet materials, including those described in detail in chapter 10, pages 247 to 334 of the Plastics Engineering Handbook of the Society of the Plastics Industry, Inc., published by the Reinhold Publishing Corporation, New York, 1954.

It is possible to provide a sheet material with embossed patterns on both sides, combining the optical effects of both patterns. For example, two separate unsupported sheets may each be embossed with a pattern on one side, and then the smooth, or back sides of the two sheets may be bonded together. If the same pattern is used on both sheets, and if one sheet has its pattern offset slightly with respect to the other, then a sort of moire effect is produced.

Figure 3:
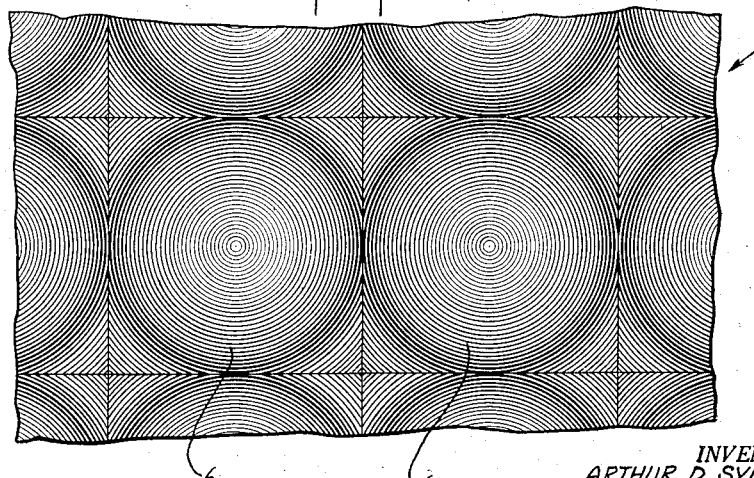
Fig. 3 is a plan view of a larger piece of sheet material showing a plurality of design areas, each having a circular pattern generally similar to that of Fig. 1, and illustrating a further feature of the invention in that the several design areas are separated from one another by discontinuities in the ridges and grooves.

*Fig. 3*

This figure illustrates a piece 5 of sheet material, including a plurality of rows and ranks of circular units, each generally indicated at 6, and each comprising concentric ridges and grooves generally similar to those appearing in the single unit shown in Fig. 1, and circumscribed by a square.

Note that in the design shown in Fig. 3, the surface of the sheet material comprises a plurality of abutting design areas which are square. Each of the square areas has formed within it a design unit consisting of a plurality of concentric circular ridges and grooves. The largest complete circles are tangent to the largest circles in the adjacent design areas. In any design area, the space between the largest complete circle and the corner of the square is filled by a series of arcuate ridges and grooves concentric with the circles. The ridges and grooves are formed with gradients as to the depths of the grooves, the peak angles of the ridges, and the slopes of corresponding sides of the ridges. These gradients, or some of them, produce an optical illusion that the ridges and grooved surfaces slope toward or away from the observer's eye. The boundaries between the different square design areas are defined only by discontinuities in the ridges and grooves of the two abutting design areas, namely the ends of the arcuate segments. This manner of defining the design areas provides a further optical illusion that sharp changes in contour, such as edges, exist along the borders of the square design areas.

This technique of producing illusions of slopes and edges may obviously be applied to design areas of other shapes and having different ridge and groove structures. See for example Fig. 8.

The master surface for making an embossing tool for reproducing the pattern of Fig. 3 may be constructed as follows:

First, a plurality of reproductions of the pattern of Fig. 1 are made, by the techniques described above in connection with that figure. These reproductions are preferably made in unsupported plastic material and may be in separate pieces or all in one sheet. The plastic material should be one which is readily susceptible to bonding to other pieces of the same material by a suitable technique, e. g., the use of a local solvent, or by heat sealing.

Next, the several reproductions of the Fig. 1 pattern are cut into square sections of the size shown in Fig. 3. Note that the cuts at the localities adjacent the corners of the squares are transverse to the ridges and grooves in the respective pieces.

The square sections are then assembled into the composite pattern of Fig. 3, and are bonded together at their edges. Care must be taken in the cutting and bonding operations that the sections fit snugly together without interstices and that the bonding operation does not mar the pattern.

Several different bonding techniques have been successfully used. It is presently preferred to assemble the pieces, with the ridges and grooved side down on a flat sheet of metal and to do the bonding on the smooth side, either by the use of tapes, bonding agents such as glues or solvents for the plastic material, or heat sealing by locally applied sealing irons. Alternatively, the pieces may be assembled, ridged side up, on a suitable backing sheet to which the pieces are bonded during assembly.

After assembly and bonding together, the master surface for making an embossing tool is complete. The tool may be made by silvering the surface, then electroplating on the silvered surface to build up a desired thickness of material, then stripping off the plastic original. The silvering and electroplating process is similar to that commonly employed, for example, in reproducing sound records.

An embossing roll or other tool for reproducing the pattern of Fig. 3 may alternatively be constructed by more conventional engraving techniques. However, not all patterns constructed in accordance with the invention lend themselves readily to such techniques.

Figs. 4 and 5

Figure 4:
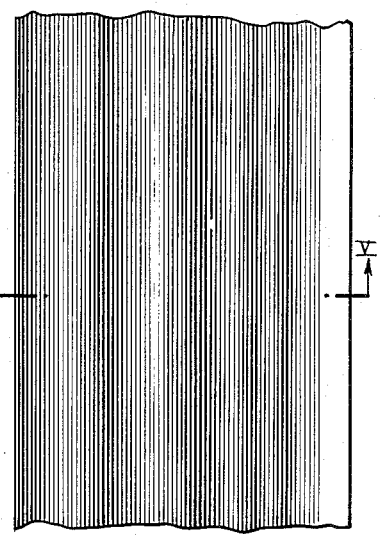
Fig. 4 is a plan view of another embodiment of the invention employing a pattern of parallel, straight ridges and grooves.

These figures illustrate a modified pattern of sheet material formed in accordance with the invention in which the ridges and grooves are straight instead of being circular as in the previous figures. The gradients of the peak angles, groove depths and the slopes of the corresponding sides of this pattern are arranged to present an illusion of a series of parallel elongated alternately convex and concave portions. The particular illusion obtained depends upon the contours of the sides of the grooves, and follows generally the principles outlined in connection with Figs. 1 and 2, except that the groove sides are planes instead of being cylindrical and conical. The piece of material in Figs. 4 and 5 is generally indicated by the reference numeral 7, and has formed in it ridges 8 separated by grooves 9.

Where the ridges and grooves are straight and parallel, as in Figs. 4 and 5, the steep sides of the ridges may face in either direction. However, all the ridges of a contiguous group should have all their steep sides facing the same way. A certain group of ridges may be contoured to produce an illusion of concavity or convexity. Alternatively, they may be made to appear convex in one locality and concave in another, by reversing the trend of the progressive variation in depth of the grooves, etc., as discussed above in connection with Fig. 1.

Note that in some places in this specification, the word "concentric" may be employed in a sense generic to "concentric circular" and "straight parallel." In this connection, it may be observed that parallel lines have sometimes been defined as concentric circles of infinite radius.

Fig. 6

This figure shows an elevational view of the edges of a sheet material formed with two plies 10 and 11. The upper ply 10 is transparent and the lower ply 11 is opaque. The underside of the upper ply 10 is formed with a pattern of ridges and grooves in accordance with the invention. The two plies 10 and 11 may be bonded together at spaced points where the bonding will not interfere with the pattern. For example, if the pattern of Fig. 3 were used, the bonding might be at the corners of the pattern units.

When viewed from above, the material shown in Fig. 6 produces an illusion of substantial depth, considerably greater than the combined thickness of the plies 10 and 11.

Figs. 7, 8 and 9

These figures illustrate composite patterns which, like that of Fig. 3, may be originally formed by cutting the circular and linear pattern units or design regions of Figs. 1 and 4 into pieces and assembling those pieces to form a new pattern. Thereafter an embossing tool for reproducing the new pattern may be formed by the process described below in connection with Figs. 10–12.

In Fig. 7, small circles have been cut from a piece of material similar to that in Fig. 1 having formed in its surface ridges and grooves of substantially larger radius than these small circles. These circles are then assembled on and bonded to a backing sheet with their ridges and grooves arranged at random orientations with respect to one another. The general effect observed in this material is a sort of button or sequin effect, with the color reflections and contour illusions of the individual sequins or buttons varying.

In Fig. 8, various triangular pieces 13, cut from one or more pattern units having a straight line pattern, are assembled with a circular piece 14 cut eccentrically from a piece having a circular pattern. In some cases ornamental strips 15 separate the triangular pieces 13. Slope illusions are present in all the pattern units, and edge illusions are produced at the discontinuities where the pieces adjoin one another.

In Fig. 9 there is illustrated a composite pattern consisting of pieces 16 of irregular quadrilateral form, and separated from each other by other small pieces 17 of trapezoidal form. In each of the pieces 16 and 17, the ridges and grooves are straight and parallel.

It should be appreciated that in any of these composite patterns, such as shown in Figs. 8 and 9, the original pattern may be made by the cutting and assembling method described in connection with Fig. 3. Other assembling methods may be used. In any such method, it is essential that the edges of the abutting pieces be bonded closely together, without interstices.

Although the patterns illustrated in Figs. 3, 8 and 9 are composite patterns in which all or substantially all the pattern units have contour illusion effects, other composite patterns may be constructed, without departing from the invention, in which part of the pattern units are provided with contour illusions and part are without contour illusions. For example, the composite patterns may include a plurality of individual illusory pattern units separated from one another by a flat or non-illusory background, as in Fig. 7.

There is no essential limitation as to the spacing between the ridges. Considerable variation between patterns may be obtained by varying that spacing. Good results are secured with spacings between $\frac{1}{100}$ inch and $\frac{1}{30}$ inch; it being presently preferred to use a spacing of the order of $\frac{1}{50}$ inch between ridges.

There are several factors combined in the optical illusions produced in accordance with the present invention. One factor is the varying reflection from the different grooves, another is the varying shadows between the different ridges. By making the grooves deeper, the shadow effect and the illusion of depth is increased. The depth of the grooves relative to their width controls the illusion. By varying the ratio of width to depth, a wide variation in the illusion may be secured.

While we have shown and described certain preferred embodiments of our invention, other modifications thereof will readily occur to those skilled in the art, and we therefore intend our invention to be limited only by the appended claims.

We claim:

1. An ornamental, limply flexible sheet material, comprising at least a surface layer of resinous plastic material, said layer having embossed in one surface a multiplicity of design areas arranged in contiguous relation, at least some of said design areas consisting of a plurality of alternating ridges and grooves, whose profiles, taken along a section at right angles to the ridges and grooves, are formed of substantially straight lines, each said ridge having one steep side and one more gently sloping side, the profiles of the steep sides of all the ridges being parallel and the profiles of the gently sloping sides varying progressively as to slope along said section, the depths of said grooves and the angles at the peaks of the successive ridges varying concomitantly and progressively along said sections, the largest peak angles and the gentlest slopes being located at the ridges adjoining the shallowest grooves, said ridges and grooves being effective to produce an optical illusion to an observer as to the slope of the sheet material toward or away from the observer.

2. An ornamental, limply flexible, sheet material as defined in claim 1, in which, in at least some of said design areas, said progressive variations of the slope of the ridge sides, the groove depth, and the peak angle are reversed at intermediate localities along the profile sections, thereby creating contrasting illusions of convexity of the sheet material on one side of said intermediate localities and of concavity on the other side thereof.

3. An ornamental, limply flexible, sheet material as defined in claim 1, in which at least some of said design areas abut one another, each of said abutting design areas having an individual pattern of ridges and grooves, the boundary between said abutting design areas being defined only by discontinuities in the ridges and grooves of both areas, whereby the different illusions produced by the individual patterns combine to produce a further illusion of a sharp change in contour at said boundary.

4. An ornamental, limply flexible, sheet material as defined in claim 1, in which said plastic material is opaque.

5. An ornamental, limply flexible sheet material as defined in claim 1, in which said plastic material is translucent and comprises the whole of said sheet material, said ridges and grooves being effective to produce an illusion of increased thickness of the material.

6. An ornamental, limply flexible, sheet material as defined in claim 1, in which the ridges and grooves of at least some of said design areas are straight and parallel.

7. The method of making from plastic sheet material a master pattern comprising abutting design areas, each area having an individual pattern of ridges and grooves, with the boundary between certain of said abutting design areas defined only by discontinuities in said ridges and grooves and providing an optical illusion of a sharp change in contour at said boundary, said method comprising the steps of forming in one surface of a flexible plastic sheet material a plurality of design regions, each having a pattern consisting of a multiplicity of alternate adjacent ridges and grooves extending continuously throughout said region, said ridges and grooves having profiles taken along a section at right angles to the ridges and grooves formed of substantially straight lines, each said ridge having one steep side and one more gently sloping side, the profiles of the steep sides of all the ridges being parallel and the profiles of the gently sloping sides varying progressively as to slope along said section, the depths of said grooves and the angles at the peaks of the successive ridges varying concomitantly and progressively along said sections, the largest peak angles and the gentlest slopes being located at the ridges adjoining the shallowest grooves, said ridges and grooves being effective to produce an optical illusion to an observer as to the slope of the sheet material toward or away from the observer, and cutting from said design regions a plurality of individual design pieces by cuts extending, at least in part, transversely to said ridges and grooves, assembling and fastening said design pieces together with said ridged and grooved surface outward and said transverse cuts of adjacent areas abutting to form said boundary, with the ridges and grooves of the abutting areas oriented in different directions.

References Cited in the file of this patent
UNITED STATES PATENTS

| | | |
|---|---|---|
| 595,270 | Soper | Dec. 7, 1897 |
| 1,703,312 | Losey et al. | Feb. 26, 1929 |
| 1,996,539 | Dufay | Apr. 2, 1935 |
| 2,269,521 | Darrah | Jan. 13, 1942 |
| 2,340,392 | Lefcourt | Feb. 1, 1944 |
| 2,588,373 | Erban | Mar. 11, 1952 |